United States Patent
Krishnan et al.

(10) Patent No.: US 12,307,750 B2
(45) Date of Patent: May 20, 2025

(54) SCALABLE KNOWLEDGE DISTILLATION TECHNIQUES FOR MACHINE LEARNING

(71) Applicant: Microsoft Technology Licensing, LLC, Redmond, WA (US)

(72) Inventors: Adit Krishnan, Mountain View, CA (US); Ji Li, San Jose, CA (US); Yixuan Wei, Beijing (CN); Xiaozhi Yu, San Jose, CA (US); Han Hu, Beijing (CN); Qi Dai, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 392 days.

(21) Appl. No.: 17/837,636

(22) Filed: Jun. 10, 2022

(65) Prior Publication Data

US 2023/0401831 A1    Dec. 14, 2023

(51) Int. Cl.
G06V 10/776    (2022.01)
G06N 3/045    (2023.01)
G06V 10/774    (2022.01)
G06V 10/82    (2022.01)

(52) U.S. Cl.
CPC .......... *G06V 10/776* (2022.01); *G06N 3/045* (2023.01); *G06V 10/7747* (2022.01); *G06V 10/82* (2022.01)

(58) Field of Classification Search
CPC .. G06V 10/776; G06V 10/7747; G06V 10/82; G06N 3/045; G06N 3/096
See application file for complete search history.

(56) References Cited

U.S. PATENT DOCUMENTS

| | | | | |
|---|---|---|---|---|
| 2020/0134506 A1* | 4/2020 | Wang | ...................... | G06N 3/088 |
| 2022/0180202 A1* | 6/2022 | Yin | ................... | G06F 18/24133 |
| 2022/0343139 A1* | 10/2022 | Passban | ................... | G06N 3/08 |
| 2022/0343175 A1* | 10/2022 | Lu | .......................... | G06N 3/088 |
| 2023/0259716 A1* | 8/2023 | Merler | .................... | G06F 40/30 |
| | | | | 704/9 |

OTHER PUBLICATIONS

Lan, et al., "Knowledge Distillation by On-the-Fly Native Ensemble", In Repository of arXiv:1806.04606v1, Jun. 12, 2018, 10 Pages.

(Continued)

*Primary Examiner* — Bobbak Safaipour
*Assistant Examiner* — Michael Kim Maiden
(74) *Attorney, Agent, or Firm* — NovoTechIP International PLLC

(57) ABSTRACT

A data processing system implements a dynamic knowledge distillation process including dividing training data into a plurality of batches of samples and distilling a student model from a teacher model using an iterative knowledge distillation. The process includes instantiating an instance of the teacher model and the student model in a memory of the data processing system and obtaining a respective batch of training data from the plurality of batches of samples in the memory. The process includes training the teacher and student models using each of the samples in the respective batch of the training data, evaluating the performance of the student model compared with the performance of the teacher model, and providing feedback to student model to adjust the behavior of the student model based on the performance of the student model.

20 Claims, 10 Drawing Sheets

(56) References Cited

OTHER PUBLICATIONS

Liu, et al., "Adaptive multi-teacher multi-level knowledge distillation", In Journal of Neurocomputing, vol. 415, Nov. 20, 2020, pp. 106-113.
Lukasik, et al., "Teacher's pet: understanding and mitigating biases in distillation", In Repository of arXiv:2106.10494v2, Jul. 8, 2021, 21 Pages.
"International Search Report and Written Opinion Issued in PCT Application No. PCT/US23/019045", Mailed Date: Aug. 28, 2023, 12 Pages.
Rao, et al., "Parameter-Efficient and Student-Friendly Knowledge Distillation", In Repository of arXiv:2205.15308v1, May 28, 2022, 14 Pages.
Ye, et al., "Generalized Knowledge Distillation via Relationship Matching", In Repository of arXiv:2205.01915v1, May 4, 2022, 21 Pages.

* cited by examiner

SCALABLE KNOWLEDGE DISTILLATION TECHNIQUES FOR MACHINE LEARNING

BACKGROUND

Neural network models have been used to implement numerous types of tasks including but not limited to information retrieval and search, text analysis tasks, and image analysis tasks. These models may provide various services for cloud-based and/or native applications. The models may be hosted on a cloud-based system or may be hosted locally on a client device of the end user. In cloud-based implementations, the model must adhere to strict latency requirements to avoid negatively impacting the user experience. Furthermore, both cloud-based and locally hosted implementations may have strict limits placed on the available memory and computing resources that may be allocated to support the model. These limitations may be particularly strict where the model is to be hosted on a smartphone or other types of mobile device in which the memory and computing resources are much more limited relative to other implementations. Despite these strict latency and computational limits, the performance of the model is critical to provide a good user experience.

Knowledge distillations is one approach that may be used to reduce the memory and computational resources needed to support a model. Knowledge distillation trains a smaller model to mimic a pre-trained, larger model. The smaller model is trained to provide results similar to those of the much larger model but consumes significantly less memory and computational resources. However, the knowledge distillations process itself can be very memory and computationally resource intensive. Hence, there is a need for improved systems and methods that provide a technical solution for efficiently implementing knowledge distillation.

SUMMARY

An example data processing system according to the disclosure may include a processor and a machine-readable medium storing executable instructions. The instructions when executed cause the processor to perform operations including dividing training data into a plurality of batches of samples and distilling a student model from a teacher model using an iterative knowledge distillation process. Distilling the student model includes: instantiating an instance of the teacher model in a memory of the data processing system, instantiating an instance of the student model in the memory, obtaining a respective batch of training data from the plurality of batches of samples in the memory, training the teacher model using each of the samples in the respective batch of the training data, training the student model using each of the samples in the respective batch of the training data, evaluating performance of the student model compared with the performance of the teacher model, and providing feedback to student model to adjust the behavior of the student model based on the performance of the student model.

An example method implemented in a data processing system for providing content recommendations based on a multilingual natural language processing model includes dividing training data into a plurality of batches of samples and distilling a student model from a teacher model using an iterative knowledge distillation process. Distilling the student model includes: instantiating an instance of the teacher model in a memory of the data processing system, instantiating an instance of the student model in the memory, obtaining a respective batch of training data from the plurality of batches of samples in the memory, training the teacher model using each of the samples in the respective batch of the training data, training the student model using each of the samples in the respective batch of the training data, evaluating performance of the student model compared with the performance of the teacher model, and providing feedback to student model to adjust behavior of the student model based on the performance of the student model.

An example machine-readable medium on which are stored instructions according to the disclosure includes instructions, which when executed, cause a processor of a programmable device to perform operations of dividing training data into a plurality of batches of samples and distilling a student model from a teacher model using an iterative knowledge distillation process. Distilling the student model includes: instantiating an instance of the teacher model in a memory of the programmable device; instantiating an instance of the student model in the memory; obtaining a respective batch of training data from the plurality of batches of samples in the memory; training the teacher model using each of the samples in the respective batch of the training data; training the student model using each of the samples in the respective batch of the training data; evaluating performance of the student model compared with the performance of the teacher model; and providing feedback to student model to adjust behavior of the student model based on the performance of the student model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
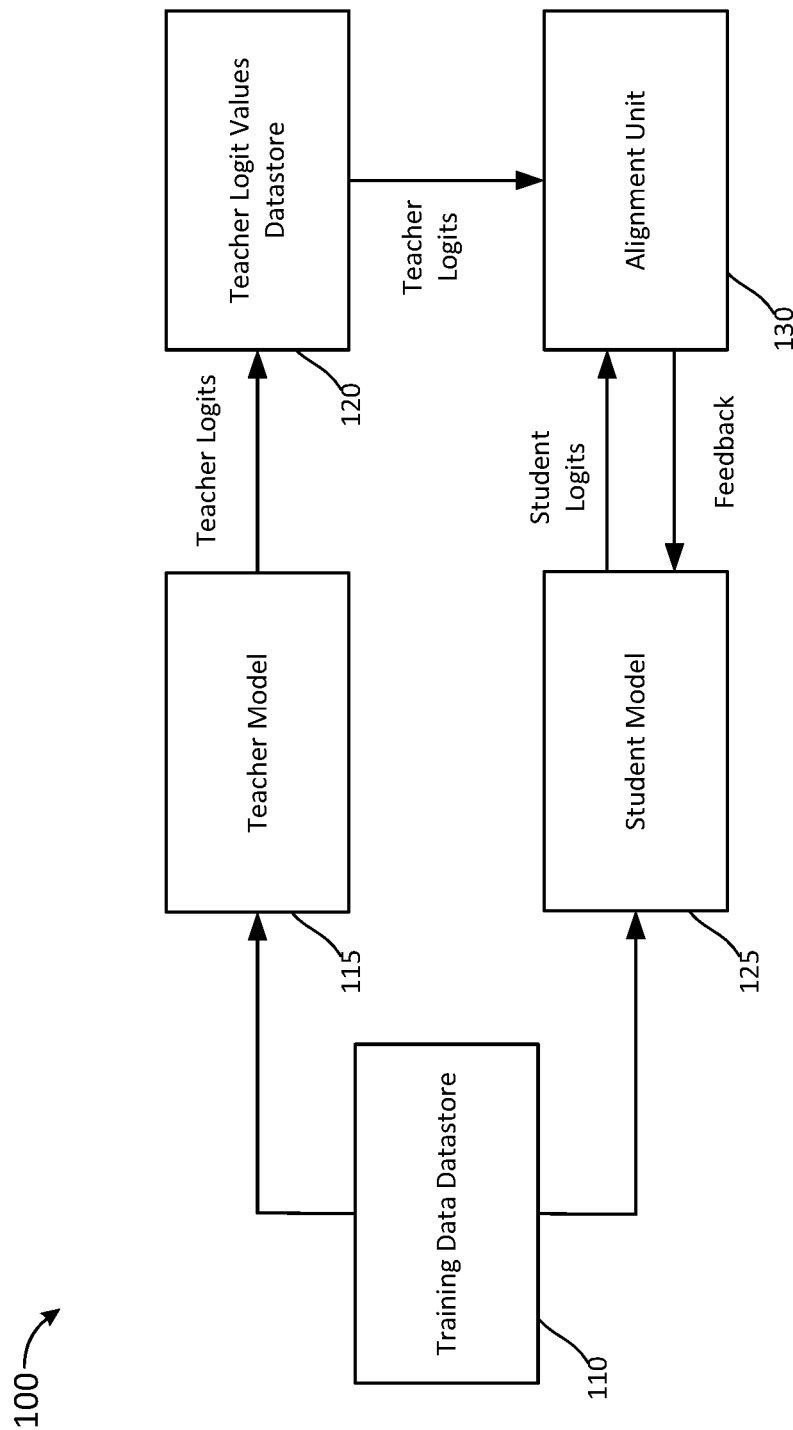
FIG. 1 is a diagram that a computing environment in which an example implementation of knowledge distillation from a teacher model to a student model is shown.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for implementing scalable knowledge distillation techniques for machine learning models are provided. These techniques provide a technical solution to the technical problem of reducing the memory and computing resources associated with knowledge distillation of machine learning models. These techniques provide an iterative approach to knowledge distillation in which a teacher model and student model are trained in parallel in an iterative process. The student model mimics the behavior of the teacher model in a smaller model that requires fewer computational and memory resources to operate the model while providing predictive performance similar to that of the teacher model. The smaller student model may be faster than the teacher model, enabling the student model to satisfy latency requirements that may not have been able to have been met by the teacher model.

Current approaches to distillation learning pretrain the teacher model on an extensive set of training data to obtain a set of teach model logits or labels. A logit is a vector of raw predictions that are generated by a classification model. A logit is generated for each training data input provided to the teacher model. The student model is the trained on the same set of training data inputs to obtain a set of student model logits data. The teacher model logit data are then compared with the student model logits data to determine how well the behavior of the student model mimics that of the teacher model. Feedback may be provided to the student model to adjust the weights and/or biases of the student model, which in turn alters the behavior of the student model to better mimic that of the teacher model. A similar approach may be implemented using labels output by classifier models. The differences between the labels output by the teacher model and the student model where the same training data samples are provided to the models as an input may be used to generate feedback for modifying the behavior of the student model.

The current approaches to knowledge distillation perform the training of the teacher model and the student model serially. The teacher model is trained first, and the teacher model logits are written to persistent storage in a teacher logit values datastore. The training data sets often include millions of training data inputs for which a corresponding logit is produced. Consequently, writing the logits to the teacher logit values datastore consumes significant input/output (I/O) resources. This problem is further exacerbated when training the student model. The same logit data must then be read from the teacher logit values datastore to be compared with the student model logits data, once again consuming a significant amount of I/O resources. Similar problems exist in implementations that utilize labels instead of logits to assess the performance of the student models The scalable knowledge distillation techniques described herein provide a technical solution to the problems of the current knowledge distillation techniques by training the teacher model and the student model in parallel and in memory of the computing environment in which the knowledge distillation ins performed. Both the teacher and the student models are maintained in the memory of the computing environment in which the training is taking place. Batches of training data are obtained from a training data datastore and provided to both the teacher model and the student model. The teacher model logits and/or labels and student model logits and/or labels for each batch of training data are maintained in memory and are compared without writing the logits and/or label data to persistent storage. The student model may be provided feedback to train the student model to better mimic the behavior of the teacher model based on differences between the logits and/or labels of the teacher model and the student model. Once the models have been trained on a particular batch of training data, the next batch of training data can be loaded into memory from the training data datastore and used to train the models. A technical benefit of this approach is that the teacher logits are not written to the teach logit value datastore and then reloaded prior to training the student model. The impact on the amount of memory required to implement this approach is negligible compared the massive reduction in I/O resources achieved by avoiding writing the logits and/or label data to persistent storage. These and other technical benefits of the techniques disclosed herein will be evident from the discussion of the example implementations that follow.

FIG. 1 is a diagram that a computing environment 100 in which an example implementation of knowledge distillation from a teacher model 115 to a student model 125 is shown. The example implementation shown in FIG. 1 shows a current serial approach to knowledge distillation in which the teacher model 115 is fully trained before the student model 125 is trained.

In the example shown in FIG. 1, the teacher model 115 may be trained using all the training data samples included in the training data datastore 110. For each training data sample, the teacher model 115 generates a teacher logit representing a vector of raw prediction data generated by the teacher model 115 for that training data sample. Other implementations may output labels instead of or in addition to the teacher logits. The training data datastore 110 may include a large number of data samples. For example, some implementations may include millions of data samples that may be used for training the teacher model 115. The teacher model 115 would generate millions of logits corresponding to each of these data samples which would then need to be written to the teacher logit values datastore 120. Writing the teacher logits to the datastore would consume an immense amount of computing, memory, and I/O resources.

Figure 2A:
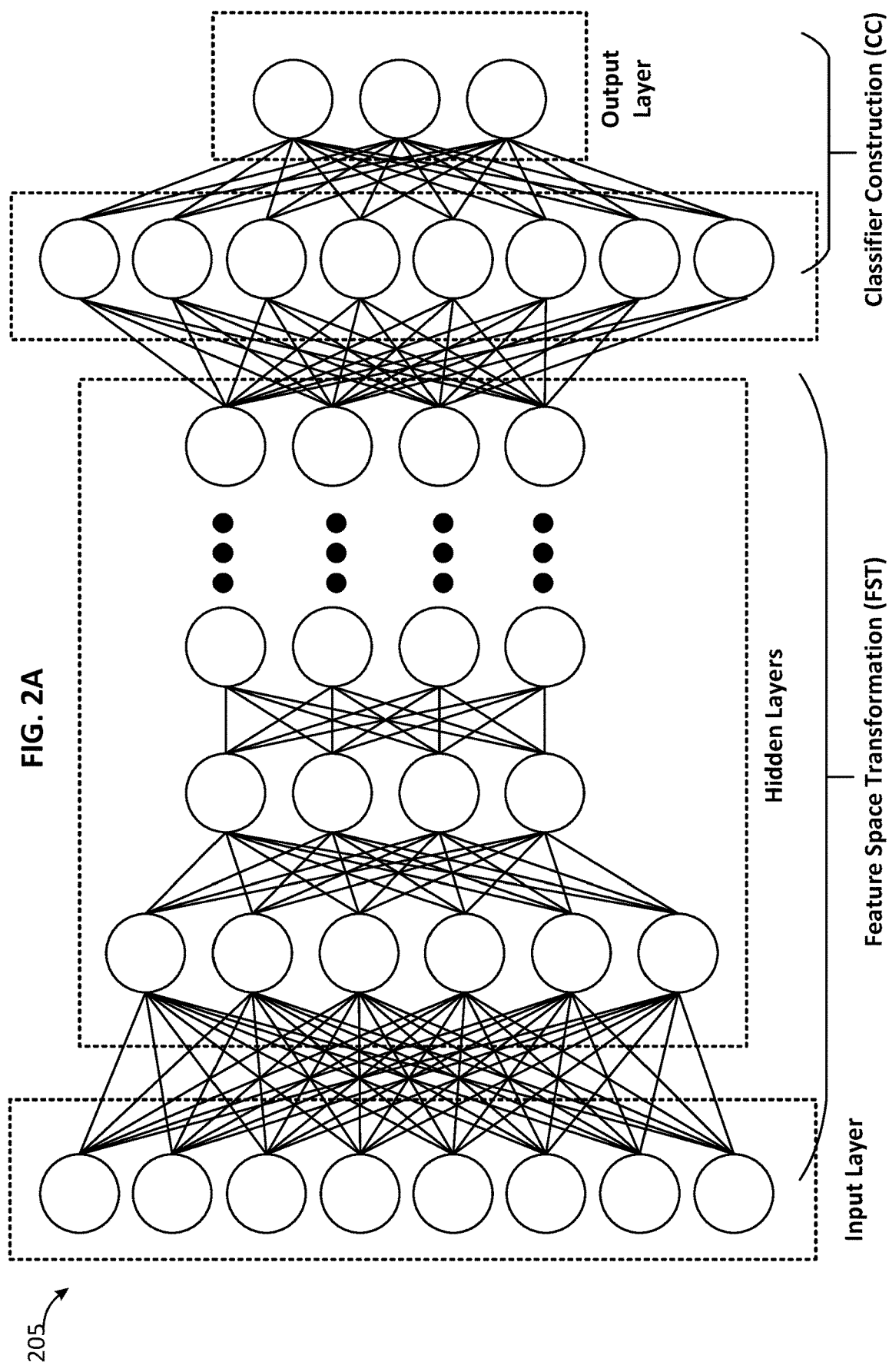
FIG. 2A shows an example of a neural network model that may be used to implement the teacher model shown in FIG. 1.

FIG. 2A shows an example of a large neural network model 205 that may be used to implement the teacher model 115. The neural network model 205 includes an input layer, hidden layers, and an output layer. The neural network model 205 includes a feature-space transformation (FST) layers and classifier construction (CC) layers. The neural network model 205 may be trained to perform various types of tasks, such as but not limited to information retrieval and search, text analysis tasks, and image analysis tasks.

A strategy that is often commonly used to improve the performance of a neural network model, such as the teacher model 115 is over-parameterization. Over-parameterization refers to the expansion of neural models with additional learnable parameters and layers and/or computational units for encoding of knowledge from the training data during the training process. Over-parameterization of the teacher model 115 may improve the performance of the model with respect to the predictions output by the teacher model 115, but such a large model is often an inefficient encoder. A large model may require significantly more memory and computational resources than a smaller model which may perform nearly as well as the large model.

Figure 2B:
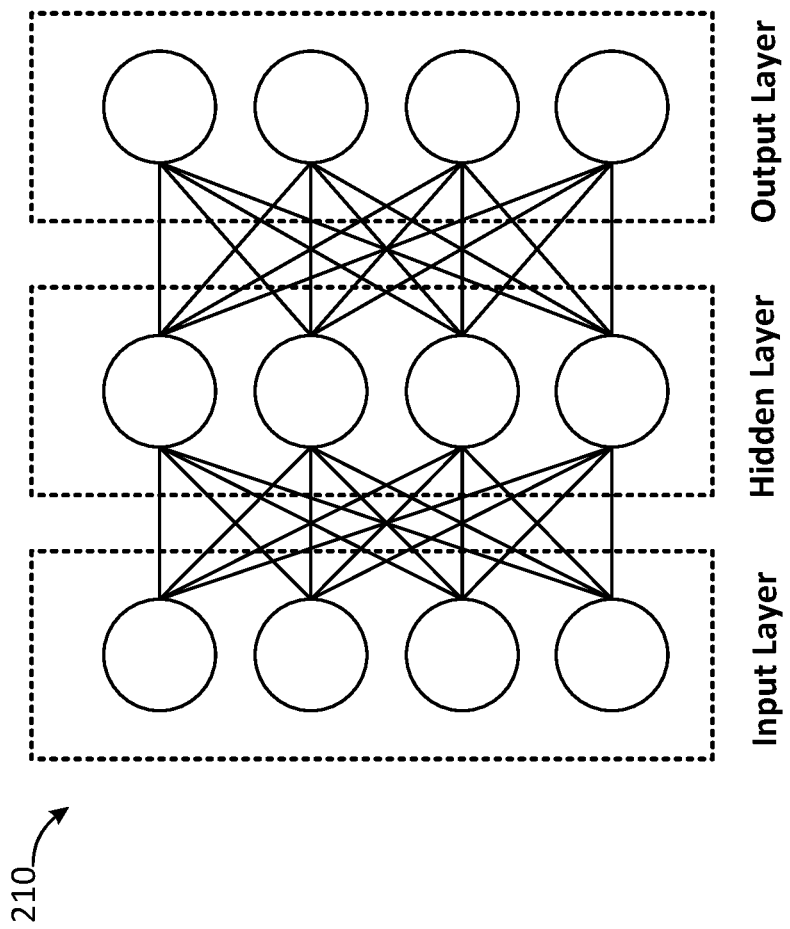
FIG. 2B shows an example of a neural network model that may be used to implement the student model shown in FIG. 1.

Knowledge distillation may be used to distill a student model 125 from the teacher model 115. The student model 125 may be include fewer layers than the teacher model 115, and thus, consume less memory and computing resources to execute the model. FIG. 2B shows an example of a smaller student model 210 that may be derived from the larger teacher model 205 shown in FIG. 2A. The specific number of layers, input parameters, and output parameters of the teacher model 205 and the student model 210 may vary depending on the implementation and are not limited to specific examples shown in FIGS. 2A and 2B. These parameters may be selected, at least in part, based on latency requirements, memory requirements, and/or computational resource limits imposed on a particular implementation of the model.

The student model 125 is trained using the same set of training data from the training data datastore 110 used to train the teacher model 115. Due to the serial nature of the current knowledge distillation techniques, the student model 125 is not trained until after the teacher model 115 has been trained. The student model 125 outputs student logits corresponding to each of the training data samples analyzed by the student model 125. Other implementations may output labels instead of or in addition to the student logits.

The alignment unit 130 is configured to access the teacher logits from the teacher logit values datastore 120 and compare the teacher logits with the student logits to determine how closely the student model 125 is mimicking the behavior of the teacher model 115 when both models have analyzed the same training data. The alignment unit 130 identifies differences in the logit values of the student model 125 and may provide feedback to the student model to cause the behavior of the student model 125 to more closely align with the behavior of the teacher model 115. Similar feedback may be provided for differences in the labels output by the teacher model 115 and the student model 125 where the models are outputting labels. How the feedback is provided and utilized by the model depends upon the implementation of the models being used in the knowledge distillation process. However, the feedback generally is used to update the learning of the student model 125 so that the student model 125 will perform better in the future.

The serial training process shown in FIG. 1 is inefficient and resource intensive. The alignment model 125 must read the teacher logits from the teacher logits values datastore 120, which once again utilizes a significant amount of I/O resources of the computing environment in which the model is being trained. Furthermore, this serial training approach is not scalable. As the amount of training data increases, the amount of memory, computing, and I/O resources also increase. The scalable knowledge distillation techniques described herein provide a technical solution to the technical problems associated with these serial knowledge distillation techniques. The examples which follow provide a scalable knowledge distillation approach which provides a technical solution to these and other technical problems of the serial approach shown in FIG. 1.

Figure 3:
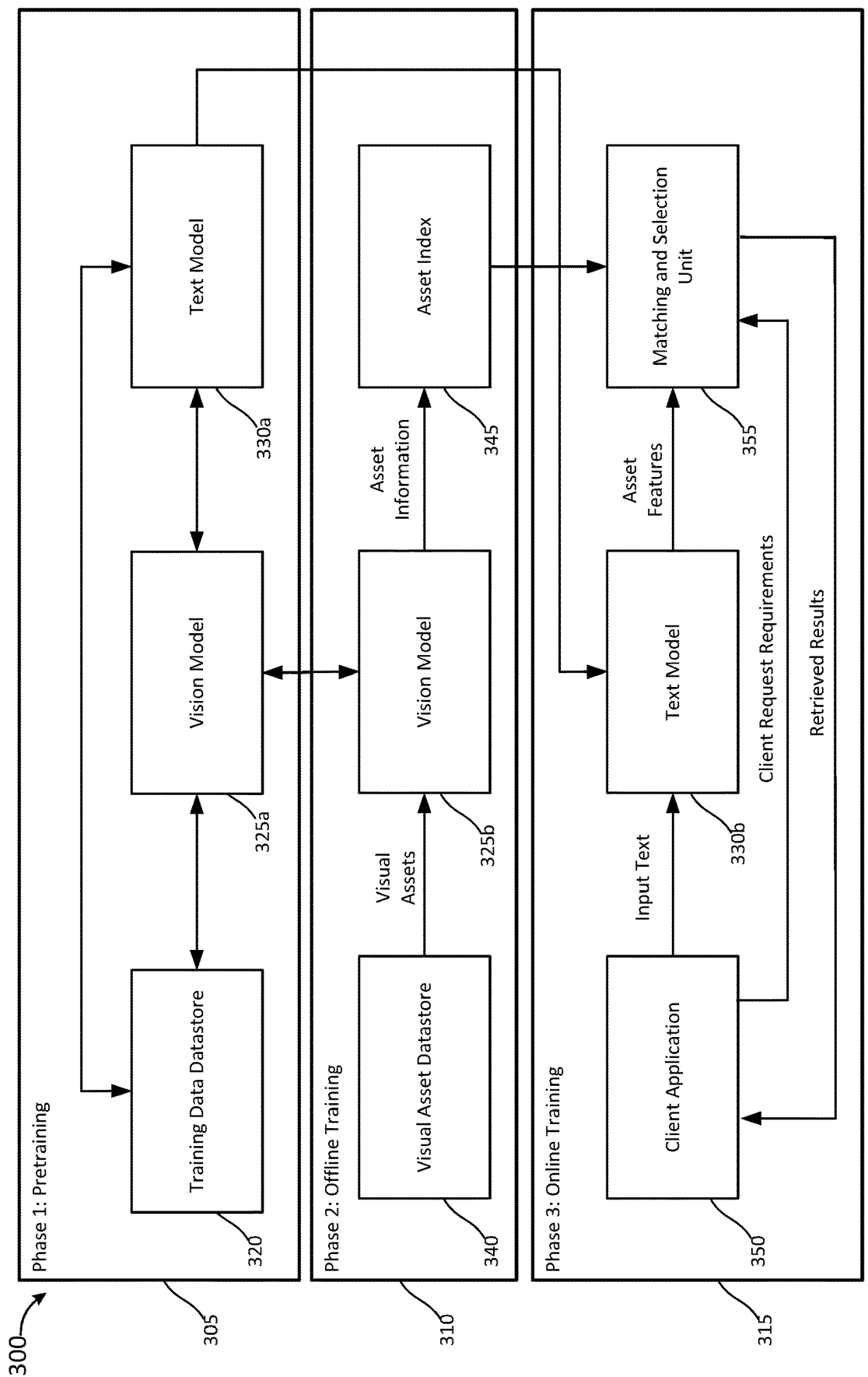
FIG. 3 is a diagram showing an example process for training models used for a visual content retrieval system.
Figure 4:
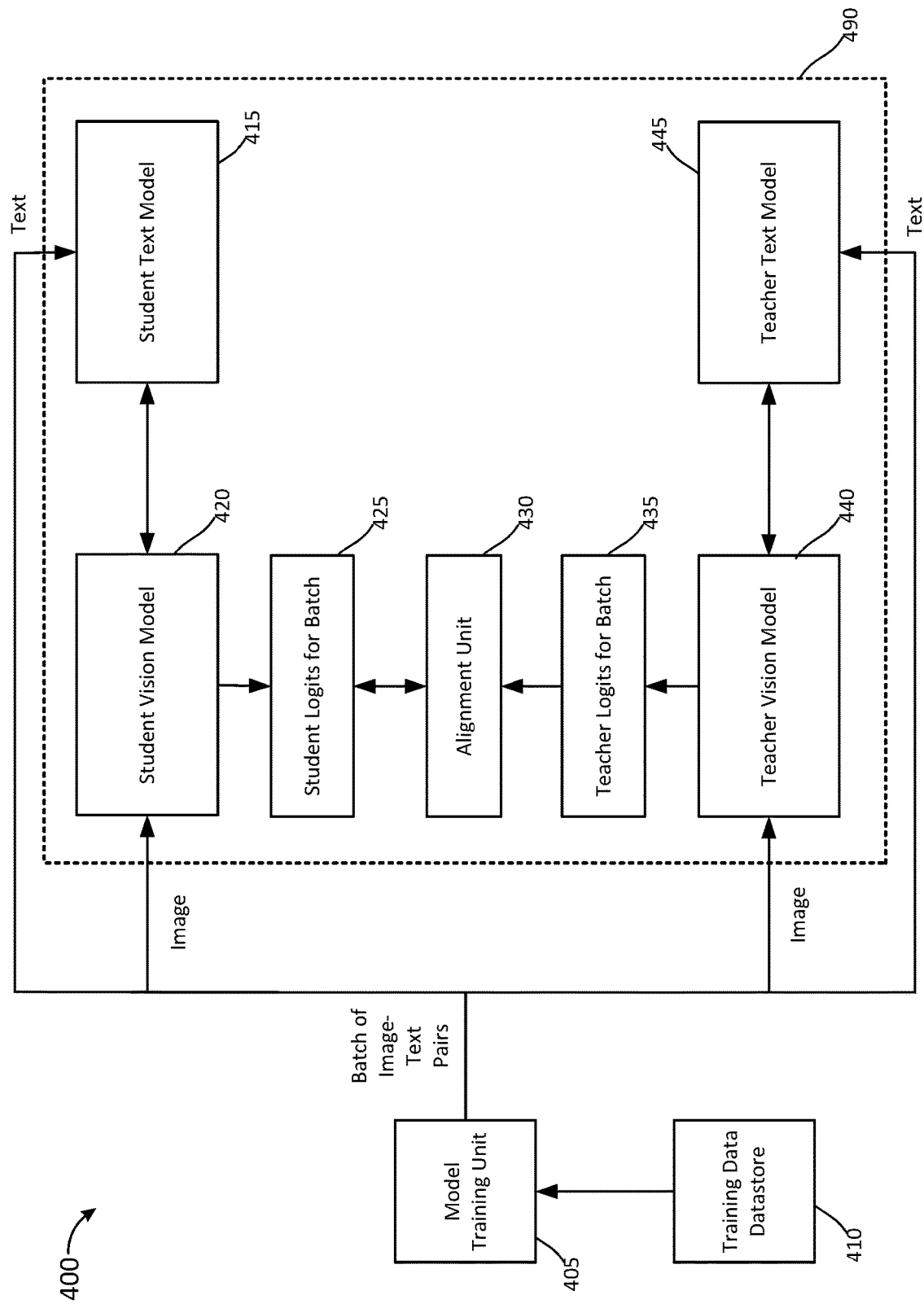
FIG. 4 is a diagram that shows a first implementation of a scalable knowledge distillation system that implements the scalable knowledge distillations techniques described herein.
Figure 5:
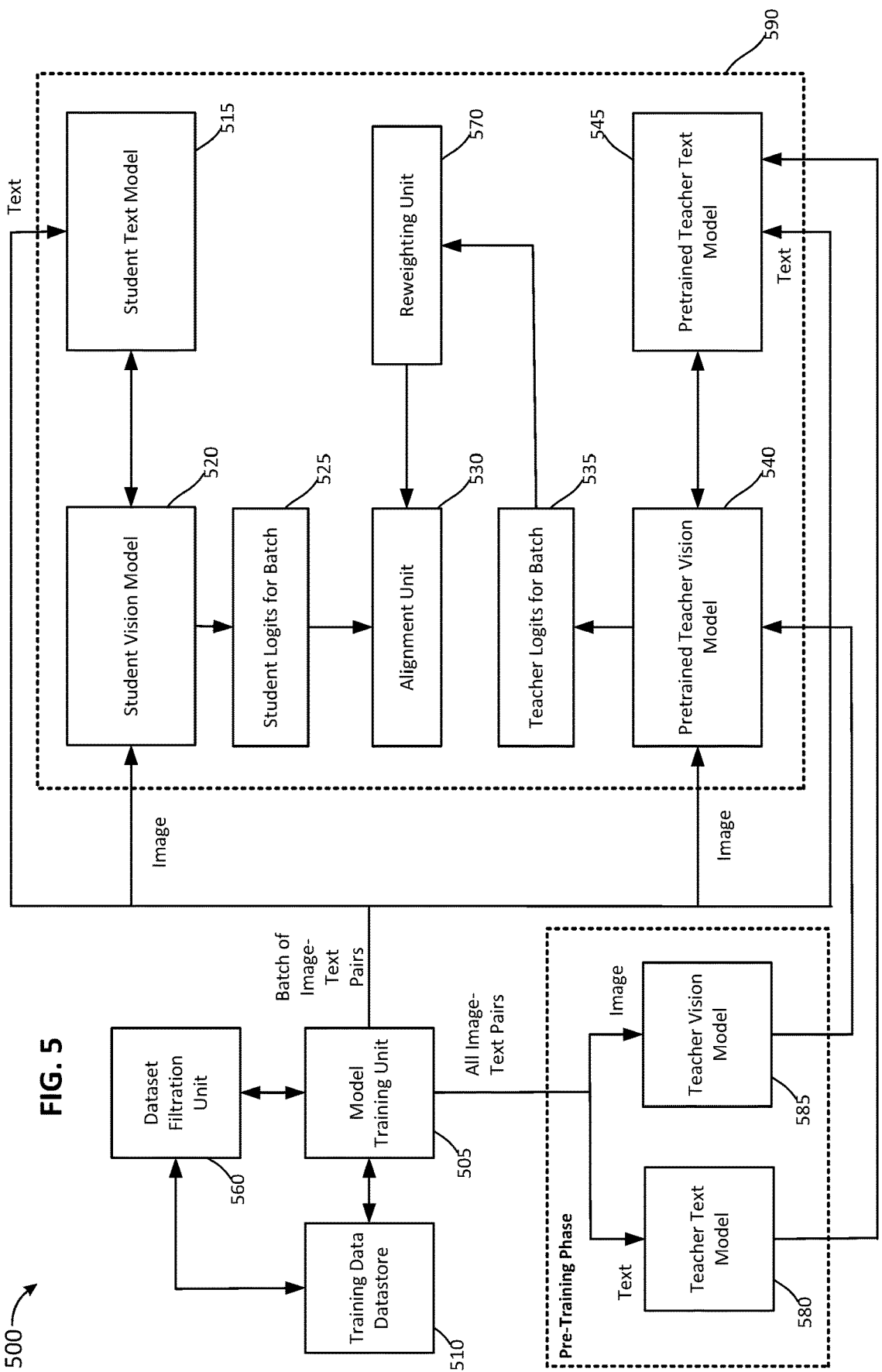
FIG. 5 is a diagram that shows a second implementation of a scalable knowledge distillation system that implements additional aspects of the scalable knowledge distillations techniques described herein.

FIG. 3 is a diagram showing an example process 300 for training models used for a visual content retrieval system. The visual content retrieval system provides means for a user to enter a textual search query to search for relevant image files. FIG. 3 introduces components of the visual content retrieval system and training large models to implement the functionality of the visual content retrieval system. FIGS. 4 and 5 then demonstrate how the scalable knowledge distillation techniques described herein may be used to reduce the size and/or latency of the models used to implement various features of the visual content retrieval system.

The example training process 300 shown in FIG. 3 includes three phases: a pretraining phase 305, an offline training phase 310, and an online training phase 315. The example shown in FIG. 3, a vision model 325 and a text model 330 are being trained. Multiple instances of the models are differentiated using a letter added to the reference number. For example, the initial version of the vision model 325 is referred to as vision model 325a in FIG. 3, and a subsequent version of the vision model 325 resulting from training the vision model 325a is referred to vision model 325b. The vision model 325 is configured to recognize and extract features from images. The text model 330 is configured to recognize and extract features from textual content. The vision model 325 and the text model 330 are used to implement a visual content retrieval system that associates certain textual content with certain visual content to facilitate searching for images using a textual query. A user may enter search text to obtain relevant images and/or video content stored in the visual asset datastore 340.

To facilitate these visual content searches, the vision model 325 and the text model 330 may be trained using image-text pairs that associate specific visual content with specific textual content. For example, an image of a parrot may be associated with textual content "a parrot in a tree" which describes the visual content. The training data datastore 320 may include numerous image-text pairs that may be used to train the vision model 325 and the text model 330. In this example, suppose that the training data datastore 320 includes 600 million image-text pairs that may be used to train the vision model 325 and the text model 330. Other implementations may use a different amount of training data. The trained version of the vision model 325b and the text model 330b are large neural network models and may be similar to the teacher model 205 shown in FIG. 2A.

In pretraining phase 305, the initial vision model 325a and the text model 330a may be initially trained with the training data included in the training data datastore 320 to produce the initial vision model 325b and the text model 330b. The pretraining phase 305 initializes the vision model 325 and the text model 330 so that the models can predict image content and textual content, respectively.

In the offline training phase 310, the vision model 325b resulting from the pretraining phase 305 is used to analyze the imagery data stored in the visual assets datastore 340. The visual asset datastore 340 includes imagery that may be provided in response to a search query from a user. The vision model 325b analyzes the contents of the visual asset datastore 340 and output feature information to the asset index datastore 345. The feature information provides features information for each of the assets that may be used for identifying assets in the visual asset datastore 340 to provide in response to a user query. In the offline training phase 310, the visual asset datastore 340 may be processed by the vision model 325*b* in batches to generate the asset information of the asset index datastore 345. The asset information may include feature information associated with each asset and a location in the visual asset datastore 340 from which the asset may be retrieved.

In the online training phase 315, the visual content retrieval system is operating and configured to receive queries from users and to provide recommendations of visual assets from the visual asset datastore 340 that match the query parameters provided by the user. The client application 350 may be a native application installed on a client device or a web-based application that is provided by a cloud service. The client application 350 may provide the user with means for creating, viewing, and/or modify various types of electronic content. For example, the client application 350 may be a presentation application that the user is using to create a presentation and the client application 350 may provide a search interface in which the user may enter a query for images, icons, videos, and/or other types of content that the user may include in the presentation. The client application 350 may capture input text representing query parameters for the types of content that the user is searching. The input text may include a word or words, a phrase, or a sentence describing the content for which the user is searching. The client application 350 provides the input text to the text model 330*b* to analyze the text and to output asset features predicted by the text model 330*b*.

The client application 350 may also provide client request requirements to the matching and selection unit 355 to further refine the search. The client request requirements may provide additional information that may further narrow the set of retrieved results that the matching and selection unit 355 may provide to the client application 350. For example, the client request requirements may specify that the results should be limited to a certain file size, a certain file type or file types, and/or other such attributes of the visual attributes of the visual attribute datastore 345 to be recommended to the user.

The visual content retrieval system shown in FIG. 3 provides an example of a system in which machine learning models may be implemented. The examples which follow demonstrate how the scalable knowledge distillation techniques may be used to in such an implementation to reduce the size of the models. However, the scalable knowledge distillation techniques are not limited to implementations of visual content retrieval systems. These techniques may be used in other types of systems that utilize machine learning models.

FIG. 4 is a diagram that shows a first implementation of a scalable knowledge distillation system 400 that implements the scalable knowledge distillations techniques described herein. The distillation system 400 shown in FIG. 4 trains the student models in parallel with the teacher models. This approach may be used to eliminate the phases 305 and 310 used in the example shown in FIG. 3.

The distillation system 400 implements an iterative training approach in which both the teacher models and the student models are simultaneously trained with a batch of data. The distillation system 400 may train these models using multiple training iterations in which the models are trained using additional batches of data. The models are maintained in the memory of the distillation system 400 during the training process and the teacher model logits and/or labels and student model logits and/or labels are maintained in memory for each training iteration. Consequently, the teacher model logits and/or labels are not written to the teacher logits value datastore when training a teacher model and subsequently retrieved from the teacher logits value datastore when aligning the student model logits and/or labels with the teacher model logits and/or labels. This approach provides a technical benefit by eliminating the significant amount of I/O resources formerly utilize for writing the teacher model logits and/or labels to and reading the teacher model logits and/or labels from the datastore. The student models are trained and aligned with the teacher models at each iteration of training process rather than training the student models after the teacher models have been fully trained, and the logit and/or label data required to perform this alignment is already available in the memory of the scalable knowledge distillation system 400.

The model training unit 405 is configured to coordinate the training of the teacher vision models and the student vision models distilled from the teacher vision models. In the example implementation shown in FIG. 4, two teacher models are trained: a teacher vision model 440 and a teacher text model 445. The teacher vision model 440 is similar to the vision model 325 shown in FIG. 3, and the teacher text model 445 is similar to the text model 330 shown in FIG. 3. The student vision model 420 and the student text model 415 may be distilled from the teacher vision model 440 and the teacher text model 445, respectively. The student vision model 420 and the student text model 415 may be used to implement the vision model 425 and the text model 330 of the visual content retrieval system shown in FIG. 3.

The student models are smaller than the teacher models from which the student models have been distilled but provide similar performance with respect to the predictions that are provided by the student models. A technical benefit of this approach is that the distilled models utilize less computing and memory resources, and thus, may be suitable for deployment to computing devices that have less computing and memory resources available. For example, the distilled student models may be deployed to smartphone, tablet, laptop, or other computing device that may not have sufficient computing and/or memory resources available to support the teacher models from which the student models have been distilled. The example shown in FIG. 4 describes how the student vision model 420 is distilled from the teacher vision model 440. The student text model 415 may be distilled from the teacher text model 445 using a similar scalable knowledge distillation process used for distilling the student vision model 420, but those steps have been omitted from FIG. 4 for clarity.

The model training unit 405 may be configured to access the model training datastore 410 obtain batches of training data from the training data datastore 410. The training data datastore 410 may include a large amount of training data. As discussed previously, some models may be trained using millions of training data examples. In the example shown in FIG. 4, the training data datastore may include image-text pairs similar to those used in the example implementation shown in FIG. 3. The model training unit 405 splits the training data into batches which will be used to train the teacher vision model 440, the teacher text model 445, the student vision model 420, and the student text model 415. While the example shown in FIG. 4 includes two student models and two teacher models, other implementations may include a single student model and teacher model or more than two student models and teacher models. The teacher vision model 440, the teacher text model 445, the student vision model 420, and the student text model 415 are stored in the memory 490 of a computing system on which the models are being trained. The model training unit 405 and the training data datastore 410 are shown as being external to the memory 490 of the computing system. As discussed in the preceding examples, the amount of training data stored in the training data datastore 410 may be far too large to be loaded into the memory 490 all at once. Furthermore, the model training unit 405 and/or the training data datastore 410 may be implemented on a separate computing system from the computing system on which the scalable knowledge distillation process is performed. For example, the computing and memory resources may be allocated on a cloud-based computing environment for executing the scalable knowledge distillation process on the teacher and student models.

The batch size of the training data obtained by the model training unit 405 from the training data datastore 410 may be configured based on the amount of memory 490 available for storing the models being trained, the training data, software, other data, and/or other resources for implementing the scalable knowledge distillation process.

The model training unit 405 may provide each text-image pair of the batch to the models as an input. The images are provided to the teacher vision model 440 and the student vision model 420, and the text is provided as an input to the teacher text model 445 and the student text model 415. The teacher and student models are trained in parallel rather than sequentially training the teacher models first and then training the student models. In the implementation shown in FIG. 4, the teacher vision model 440 outputs the teacher logits for the batch 435 and the student vision model 420 outputs the student logits for the batch 425.

Figure 6:
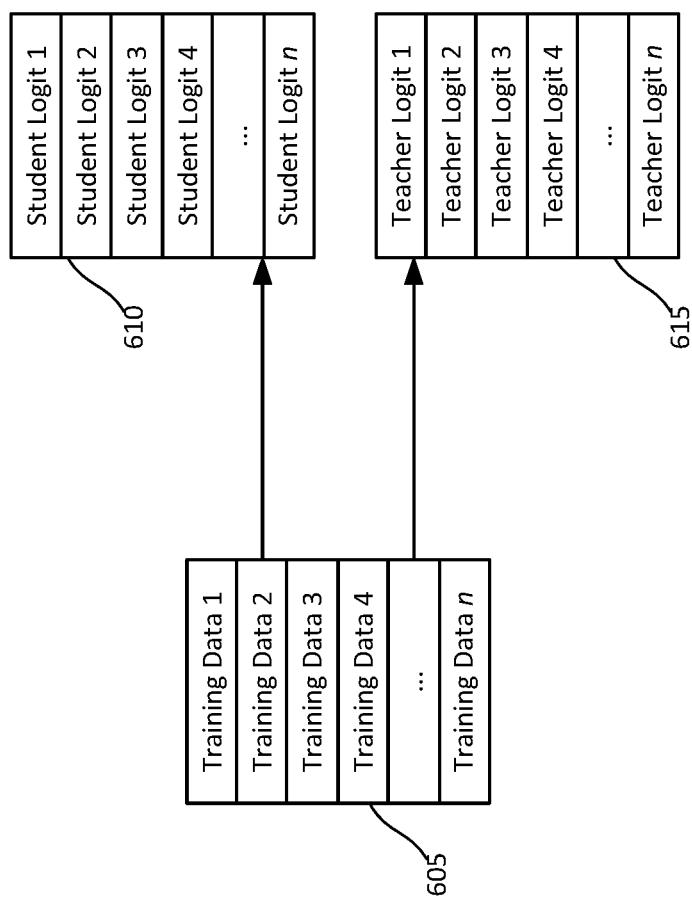
FIG. 6 is a diagram that shows an example of training data and the logits that may be generated by a teacher model and student model trained on the training data.

The alignment unit 430 compares the respective teacher logit and the respective student logit associated with the same training data. FIG. 6 shows example training data 605 that includes n training data samples, where n is a positive integer value. In the example shown in FIG. 4, each training data sample is an image-text pair. The teacher vision model 440 outputs a set of teacher logits, such as the teacher logits 615, and the student vision model 420 outputs a set of student logits, such as the student logits 610. The student logits 610 and the teacher logits 615 each include n logits, which correspond to the n training data samples provided as inputs to the teacher and student models. The alignment unit 430 compares the ith logit of the teacher logits 615 with the ith logit of the student logits 610. The alignment unit 430 identifies differences between the logits of the teacher vision model 440 and the student vison model 420. The alignment unit 430 may provide feedback to the student vision model 420 to cause the behavior of the model to mimic the behavior of the teacher vision model 440 more closely. This feedback may be determined based on the difference between the logits of logits of the teacher vision model 440 and the logits the student vison model 420. The specific type and format of the feedback provide depends upon the implementation of the student vision model 420.

The teacher text model 445 and the student text model 415 may be trained in parallel using a similar approach as is used for training the teacher vision model 440 and the student vision model 420. The teacher logits and the student logits would be compared by the alignment unit 430. The alignment unit 430 may adjust the student logit values.

The model training unit 405 is configured to load the next batch of training data from the training data datastore 410 once the previously loaded batch of training data has been processed. The scalable knowledge distillation process continues with subsequent iterations of the training process until all the training data to be used for the training has been processed. The teacher vision model 440, the teacher text model 445, the student vision model 420, and the student text model 415 remain in the memory 490 as the next iteration of training commences. Once all the training data has been processed, model information for the student vision model 420 and the student text model 415 may be stored to a persistent memory to permit the trained models to be deployed to one or more computing environments. The model information may include weights and/or bias information of the nodes of the model. This information may be used to deploy the trained model to a computing environment. In some implementations, the model information for the teacher vision model 440 and the teacher text model 445 may also be stored to the persistent memory.

The student text model 415 may be deployed as the text model 330 of the visual content retrieval system shown in FIG. 3, and the student vision model 420 may be deployed as the vision model 425 of the visual content retrieval system shown in FIG. 3. The scalable knowledge distillation process shown in FIG. 4 may be used to replace phases 305 and 310 shown in FIG. 3. A technical benefit of deploying the student models rather than the teacher models for use by the visual content retrieval system is that the student models are much smaller than the teacher models but provide similar performance regarding predictions as the teacher models. Thus, the computational resources and/or memory requirements for supporting the models may be significantly reduced by utilizing the student models distilled from the teacher models using the scalable knowledge distillation process.

FIG. 5 is a diagram that shows a second implementation of a scalable knowledge distillation system 500 that implements the scalable knowledge distillations techniques described herein. The example implementation shown in FIG. 5 may be used where the teacher models are trained on a massive corpus of training data similar to that used to train the models in the example shown in FIG. 4. However, in the example shown in FIG. 5, the student models are only required to learn a subset of the tasks encoded by the teacher models. This subset may be selected based on the model and data modalities. For example, the student models may only be required to perform text-image searches on a selected classes of images while the teacher models are trained as general-purpose search models. To implement selective distillation, system 500 introduces a dataset filtration unit 560 and a reweighting unit 570.

The system 500 also introduces a pretraining phase in which the teacher text model 580 and the teacher vision model 585 are pretrained using all the training data in the training data datastore 510. The model training unit 505 provides the training data samples to the text model 580 and the teacher vision model 585. The training data samples in this example are image-text pairs. The image of the training data sample is provided to the teacher vision model 585 and corresponding text of the training data sample is provided to the teacher text model 580. The teacher models are pretrained using the full corpus of the data, but the student models are trained using only a subset of the training data samples as discussed below. The student models are to be trained to perform a subset of the tasks encoded by the teacher models. The pretrained teacher vision model 540 represents the teacher vision model 585 that has been pretrained using the corpus of training data from the training data datastore 510, and the pretrained teacher text model 545 represents the teacher text model 580 that was also pretrained during the pretraining phase.

Once the pretraining phase has been completed, the distillation training of the student vision model 520 and the student text model 515 can be performed in the memory 590. The model training unit 505 obtains training data samples from the dataset filtration unit 560, which is configured to select batches of training data samples from the training data datastore 510. The dataset filtration unit 560 selects data that corresponds to the learning tasks that the student models are required to handle. For example, if the student models are required to handle a predefined subset of the image classes included in the training data samples, the student models are only required to be trained using images from the subset of images classes to be supported. The model training unit 505 may provide an interface for a user to specify the specific image classes to be included in a selective knowledge distillation scenario.

The model training unit 505 provides the batches of image-text pairs to both the pretrained teacher vision model 540, the pretrained teacher text model 545, the student vision model 520, and the student text model 515. The pretrained teacher vision model 540 outputs the teacher logits for the batch 535, and the student vision model 520 outputs the student logits for the batch 525.

Unlike the system 400 shown in FIG. 4, the system 500 includes the reweighting unit 570 which is configured to adjust the teacher logits for the batch 535 to reflect the tasks which are important for the student vision model 520. In some implementations, the student model handles not just a subset of the tasks for which the teacher model is trained, but also a different distribution of tasks. For instance, the pretrained teacher vision model 540 may encounter class-A queries three times as frequently as class-B queries but the student vision model 520 may be deployed in a scenario where this distribution is reversed and the student vision model 520 may encounter class-B queries more frequently. To enable optimal performance under distribution shifts of this kind, the reweighting unit 570 is introduced in the distillation process to assign a higher importance to more frequent data classes in the distillation process.

The alignment unit 530 receives the reweighted teacher logits 535 and the student logics 525 as an input. The alignment unit 530 may operate similarly to the alignment unit 430. The alignment unit 430 compares the respective teacher logit and the respective student logit associated with the same training data sample. The alignment unit 530 identifies differences between the logits of the teacher vision model 540 and the student vison model 520 and provides feedback to the student vision model 520 so that the behavior of the student vision model 520 more closely mimics the behavior of the teacher vision model 540 more closely.

The student text model 515 may be deployed as the text model 330 of the visual content retrieval system shown in FIG. 3, and the student vision model 520 may be deployed as the vision model 525 of the visual content retrieval system shown in FIG. 3. A technical benefit of deploying the student models rather than the teacher models for use by the visual content retrieval system is that the student models are much smaller than the teacher models but provide similar performance regarding predictions as the teacher models. Thus, the computational resources and/or memory requirements for supporting the models may be significantly reduced by utilizing the student models distilled from the teacher models using the scalable knowledge distillation process. Furthermore, through the use of filtering and weighting the student models can be trained to perform well for the types of inputs that the student models are expected to encounter when in use.

Figure 7:
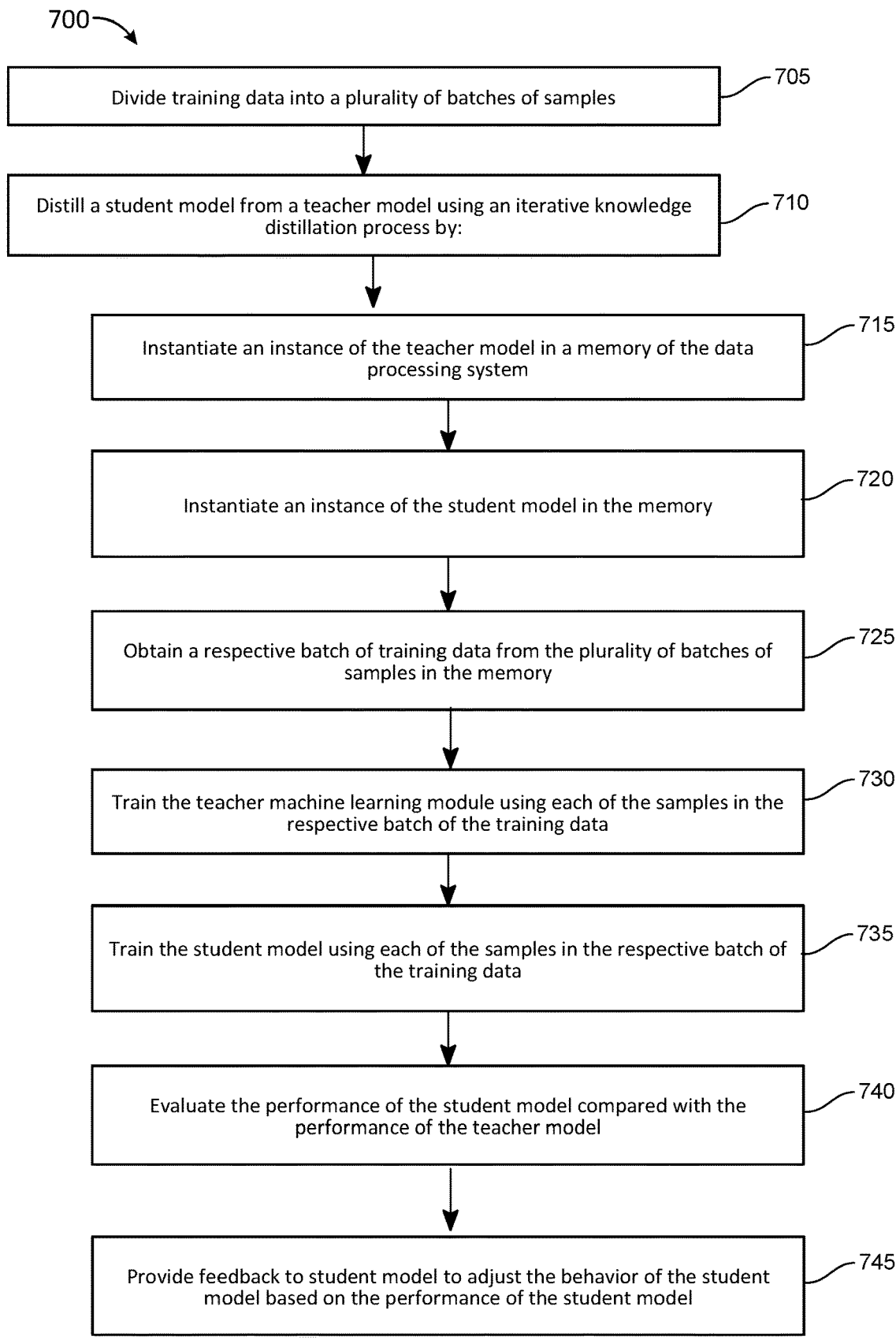
FIG. 7 is an example flow chart of an example process 700 for scalable knowledge distillation.

FIG. 7 is an example flow chart of an example process 700 for scalable knowledge distillation. The process 700 may be implemented by the scalable knowledge distillation system 400 or the scalable knowledge distillation system 500 described in the preceding examples.

The process 700 may include an operation 705 of dividing training data into a plurality of batches of samples. As discussed with respect to the example implementations shown in FIGS. 4 and 5, the training data may be divided into batches for processing to facilitate performing the knowledge distillation within the memory of the scalable knowledge distillation system 400 or the scalable knowledge distillation system 500 to avoid having to write logits or label information to a disk or other persistent storage. A technical benefit of this approach is that the I/O requirements associated with the knowledge distillation is significantly decreased.

The process 700 may include an operation 710 of distilling a student model from a teacher model using an iterative knowledge distillation process. Distilling the student model may be implemented by the operations 715, 720, 725, 730, 735, and 740.

The process 700 may include an operation 715 of instantiating an instance of the teacher model in a memory of the data processing system and an operation 720 of instantiating an instance of the student model in the memory. The teacher and student models are loaded into the memory of the scalable knowledge distillation system 400 or scalable knowledge distillation system 500 for training.

The process 700 may include an operation 725 of obtaining a respective batch of training data from the plurality of batches of samples in the memory. The model training unit 405 or 505 may obtain the batch of training data from the training data datastore 410 or 510. In the example implementation shown in FIG. 5, the data filtration unit 560 filters the training data to exclude training data that is not relevant for training the student model.

The process 700 may include an operation 730 of training the teacher model using each of the samples in the respective batch of the training data and an operation 735 of training the student model using each of the samples in the respective batch of the training data. The batch of training data is used to train both the teacher model and the student model. Unlike previous approaches to knowledge distillation in which the teacher model is trained fully first before training the student model, the teacher model and the student model are trained in parallel in an incremental manner. Thus, the scalable knowledge distillation process 700 can be thought of as an incremental distillation, where the student model closely follows and mirrors every intermediate state of the teacher instead of waiting for a fully refined/trained teacher model.

The process 700 may include an operation 740 of evaluating the performance of the student model compared with the performance of the teacher model. The alignment unit 530 may compare logits of the student and teacher models and/or labels output by the models to determine whether the student model is performing similarly to the teacher model when receiving the same data as an input. This alignment of the logits or labels between the teacher and student models is performed in memory of the scalable knowledge distillation system 400 or scalable knowledge distillation system 500, thus completely avoiding the need for I/O operations utilized in previous knowledge distillation implementations, such as the implementation shown in FIG. 3.

The process 700 may include an operation 745 of providing feedback to student model to adjust the behavior of the student model based on the performance of the student model. Feedback is provided to the student model to change the behavior of the model to be more like that of the teacher model where the performance of the model is found to deviate from the behavior of the teacher model. This improves the training of the student model and enables the student model to provide predictions nearly as good as or better than those provided by the teacher model.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
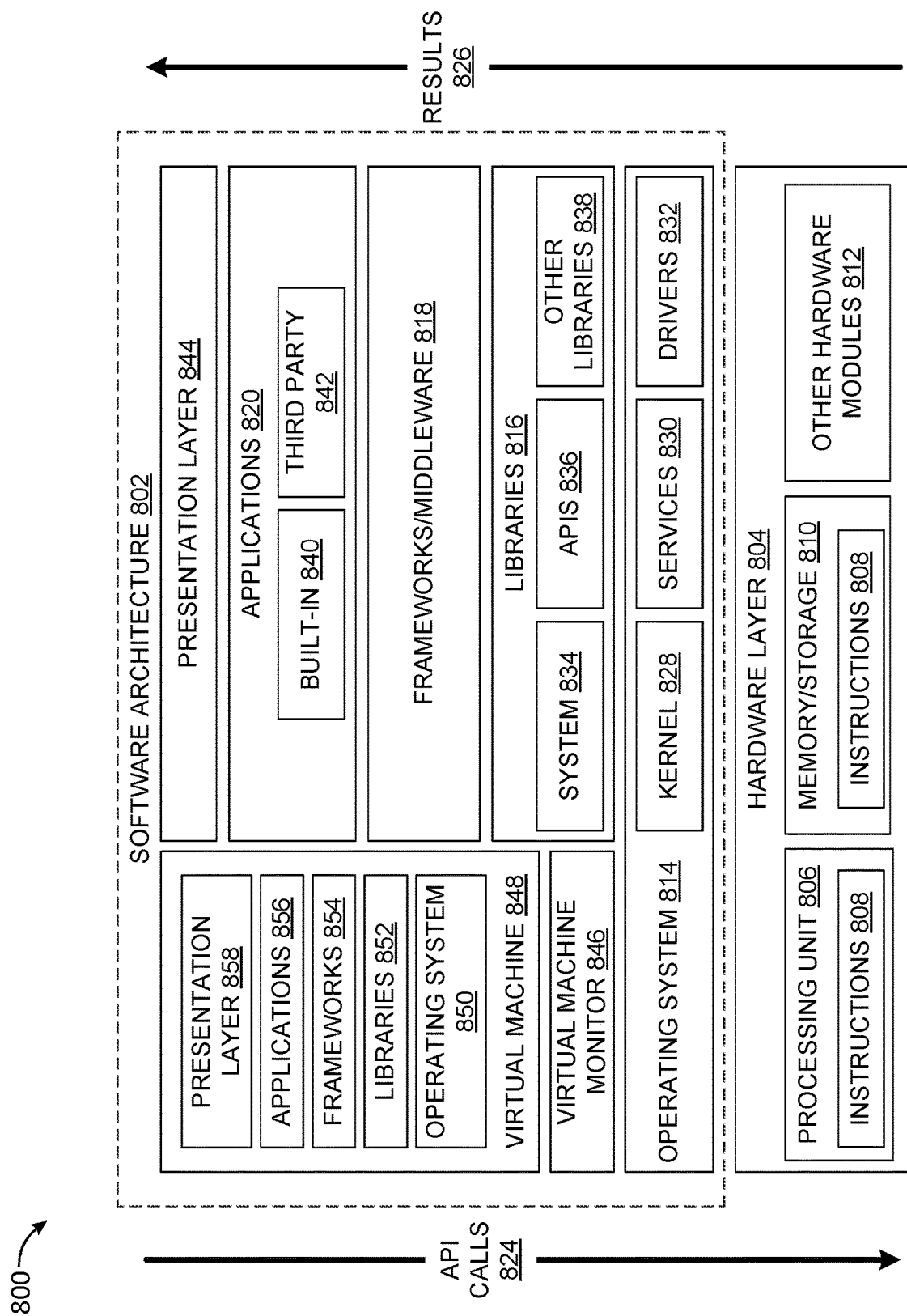
FIG. 8 is a block diagram showing an example software architecture, various portions of which may be used in conjunction with various hardware architectures herein described, which may implement any of the described features.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
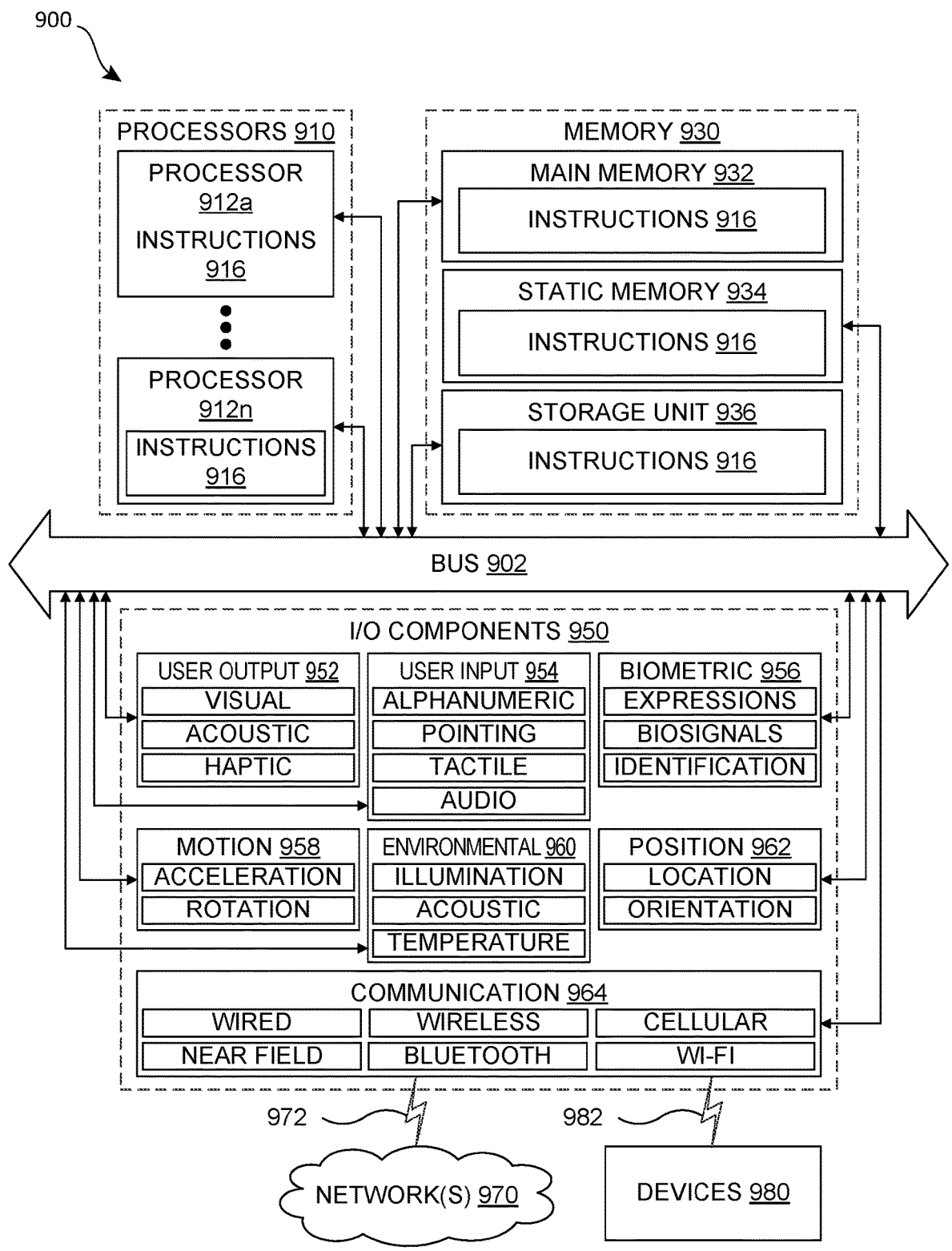
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable storage medium storing executable instructions that, when executed, cause the processor to perform operations comprising:
   instantiating an instance of a teacher model in a memory of the data processing system;
   instantiating an instance of a student model in the memory of the data processing system;
   dividing training data into a plurality of batches of samples, wherein a size of the plurality of batches of samples is based at least in part on an amount of the memory available for training the student model after instantiating the instance of the teacher model and the instance of the student model; and
   training the student model to replicate performance of the teacher model using an iterative knowledge distillation process in which the teacher model and the student model are trained in parallel during each iteration of the iterative knowledge distillation process by:
   obtaining a respective batch of training data from the plurality of batches of samples in the memory;
   training the teacher model using each of the samples in the respective batch of training data;
   training the student model using each of the samples in the respective batch of training data;
   evaluating performance of the student model compared with the performance of the teacher model; and
   providing feedback to student model to adjust behavior of the student model based on the performance of the student model.

2. The data processing system of claim 1, for each respective batch of the plurality of batches of samples that have not yet been processed, performing operations of:
   training the teacher model using each of the samples in the respective batch of training data;
   training the student model using each of the samples in the respective batch of training data;
   evaluating the performance of the student model; and
   providing feedback to student model based on the performance of the student model.

3. The data processing system of claim 1, wherein the machine-readable storage medium includes instructions configured to cause the processor to perform operations of:
   comparing first logits associated with the teacher model with second logits associated with the student model; and
   determining the feedback to the student model based on differences between the first logits and the second logits.

4. The data processing system of claim 1, wherein the machine-readable storage medium includes instructions configured to cause the processor to perform operations of:
   comparing first labels output by the teacher model with second labels output by the student model; and determining the feedback to the student model based on differences between the first labels and the second labels.

5. The data processing system of claim 1, wherein the machine-readable storage medium includes instructions configured to cause the processor to perform operations of:
filtering the training data used to train the student model to exclude training data not associated with features for which the student model is to be trained.

6. The data processing system of claim 5, wherein the machine-readable storage medium includes instructions configured to cause the processor to perform operations of:
adjusting weights associated with first logits associated with the teacher model to reflect an importance of data classes based on a likelihood of the student model receiving input data associated with the data classes to obtain first weighted logits;
comparing the first weighted logits with second logits associated with the student model; and
determining the feedback to the student model based on differences between the first weighted logits and the second logits.

7. The data processing system of claim 5, wherein the machine-readable storage medium includes instructions configured to cause the processor to perform operations of:
pretraining the teacher model using all the training data prior to distilling the student model from the teacher model.

8. A method implemented in a data processing system for distilling a student model from a teacher model, the method comprising:
instantiating an instance of a teacher model in a memory of the data processing system;
instantiating an instance of a student model in the memory of the data processing system;
dividing training data into a plurality of batches of samples, wherein a size of the plurality of batches of samples is based at least in part on an amount of the memory available for training the student model after instantiating the instance of the teacher model and the instance of the student model; and
training the student model to replicate performance of the teacher model using an iterative knowledge distillation process in which the teacher model and the student model are trained in parallel during each iteration of the iterative knowledge distillation process by:
obtaining a respective batch of training data from the plurality of batches of samples in the memory;
training the teacher model using each of the samples in the respective batch of training data;
training the student model using each of the samples in the respective batch of training data;
evaluating performance of the student model compared with the performance of the teacher model; and
providing feedback to student model to adjust behavior of the student model based on the performance of the student model.

9. The method of claim 8, the method further comprising for each respective batch of the plurality of batches of samples that have not yet been processed:
training the teacher model using each of the samples in the respective batch of training data;
training the student model using each of the samples in the respective batch of training data;
evaluating the performance of the student model; and
providing feedback to student model based on the performance of the student model.

10. The method of claim 8, further comprising:
comparing first logits associated with the teacher model with second logits associated with the student model; and
determining the feedback to the student model based on differences between the first logits and the second logits.

11. The method of claim 8, further comprising:
comparing first labels output by the teacher model with second labels output by the student model; and
determining the feedback to the student model based on differences between the first labels and the second labels.

12. The method of claim 8, further comprising:
filtering the training data used to train the student model to exclude training data not associated with features for which the student model is to be trained.

13. The method of claim 11, further comprising:
adjusting weights associated with first logits associated with the teacher model to reflect an importance of data classes based on a likelihood of the student model receiving input data associated with the data classes to obtain first weighted logits;
comparing the first weighted logits with second logits associated with the student model; and
determining the feedback to the student model based on differences between the first weighted logits and the second logits.

14. The method of claim 11, further comprising:
pretraining the teacher model using all the training data prior to distilling the student model from the teacher model.

15. A machine-readable medium on which are stored instructions that, when executed, cause a processor of a programmable device to perform operations of:
instantiating an instance of a teacher model in a memory of the programmable device;
instantiating an instance of a student model in the memory of the programmable device;
dividing training data into a plurality of batches of samples, wherein a size of the plurality of batches of samples is based at least in part on an amount of the memory available for training the student model after instantiating the instance of the teacher model and the instance of the student model; and
training the student model to replicate performance of the teacher model using an iterative knowledge distillation process in which the teacher model and the student model are trained in parallel during each iteration of the iterative knowledge distillation process by:
obtaining a respective batch of training data from the plurality of batches of samples in the memory;
training the teacher model using each of the samples in the respective batch of training data;
training the student model using each of the samples in the respective batch of training data;
evaluating performance of the student model compared with the performance of the teacher model; and
providing feedback to student model to adjust behavior of the student model based on the performance of the student model.

16. The machine-readable medium of claim 15, for each respective batch of the plurality of batches of samples that have not yet been processed, performing operations of:
training the teacher model using each of the samples in the respective batch of training data;

training the student model using each of the samples in the respective batch of training data;

evaluating the performance of the student model; and providing feedback to student model based on the performance of the student model.

17. The machine-readable medium of claim 15, wherein the machine-readable medium includes instructions configured to cause the processor to perform operations of:

comparing first logits associated with the teacher model with second logits associated with the student model; and determining the feedback to the student model based on differences between the first logits and the second logits.

18. The machine-readable medium of claim 15, wherein the machine-readable medium includes instructions configured to cause the processor to perform operations of:

comparing first labels output by the teacher model with second labels output by the student model; and determining the feedback to the student model based on differences between the first labels and the second labels.

19. The machine-readable medium of claim 15, wherein the machine-readable medium includes instructions configured to cause the processor to perform operations of:

filtering the training data used to train the student model to exclude training data not associated with features for which the student model is to be trained.

20. The machine-readable medium of claim 19, wherein the machine-readable medium includes instructions configured to cause the processor to perform operations of:

pretraining the teacher model using all the training data prior to distilling the student model from the teacher model.

* * * * *